United States Patent
Morse et al.

(10) Patent No.: US 11,108,353 B1
(45) Date of Patent: Aug. 31, 2021

(54) SYSTEMS AND METHODS FOR ARRAY LEVEL TERRAIN BASED BACKTRACKING

(71) Applicant: FTC Solar, Inc., Austin, TX (US)

(72) Inventors: Andrew Joseph Morse, Mount Airy, MD (US); Nagendra Srinivas Cherukupalli, Cupertino, CA (US)

(73) Assignee: FTC Solar, Inc., Austin, TX (US)

( * ) Notice: Subject to any disclaimer, the term of this patent is extended or adjusted under 35 U.S.C. 154(b) by 0 days.

(21) Appl. No.: 17/019,806

(22) Filed: Sep. 14, 2020

Related U.S. Application Data

(63) Continuation-in-part of application No. 16/928,679, filed on Jul. 14, 2020.

(51) Int. Cl.
 - *H02S 20/32* (2014.01)
 - *G01J 1/42* (2006.01)
 - *G01S 3/786* (2006.01)

(52) U.S. Cl.
CPC ............ *H02S 20/32* (2014.12); *G01J 1/42* (2013.01); *G01S 3/7862* (2013.01); *G01J 2001/4266* (2013.01)

(58) Field of Classification Search
CPC .......... H02S 20/32; G01S 3/7862; G01J 1/42; G01J 2001/4266
See application file for complete search history.

(56) References Cited

U.S. PATENT DOCUMENTS

| | | | |
|---|---|---|---|
| 4,202,321 A | 5/1980 | Volna | |
| 4,223,214 A | 9/1980 | Dorian et al. | |
| 4,226,502 A | 10/1980 | Gunzler | |
| 4,328,789 A | 5/1982 | Nelson | |
| 4,365,616 A | 12/1982 | Vandenberg | |
| 4,383,520 A | 5/1983 | Huebl et al. | |
| 4,574,659 A | 3/1986 | Arndt | |
| 4,883,340 A | 11/1989 | Dominguez | |
| 7,374,137 B2 | 5/2008 | Staney | |
| 7,692,091 B2 | 4/2010 | Altaii et al. | |
| 8,151,787 B1 | 4/2012 | Sivert | |
| 8,274,028 B2 | 9/2012 | Needham | |
| 8,413,391 B2 | 4/2013 | Seery et al. | |
| 8,459,249 B2 | 6/2013 | Corio | |

(Continued)

OTHER PUBLICATIONS

US 10,768,266 B2, 09/2020, Corio (withdrawn)

(Continued)

*Primary Examiner* — Santosh R Poudel
(74) *Attorney, Agent, or Firm* — Armstrong Teasdale LLP

(57) ABSTRACT

A system and method for array level terrain based backtracking includes a tracker configured to collect solar irradiance and attached to a rotational mechanism for changing a plane of the tracker and a controller in communication with a rotational mechanism. The controller is programmed to determine a position of the sun at a first specific point in time, retrieve height information, execute a shadow model based on the retrieved height information and the position of the sun, determine a first angle for the tracker; collect an angle for each tracker in a plurality of trackers in an array; adjust the first angle based on executing the shadow model with the first angle and the plurality of angles associated with the plurality of trackers; transmit instructions to the rotational mechanism to change the plane of the tracker to the adjusted first angle.

17 Claims, 12 Drawing Sheets

(56) References Cited

U.S. PATENT DOCUMENTS

| | | |
|---|---|---|
| 8,502,129 B2 | 8/2013 | Miller et al. |
| 8,511,297 B2 | 8/2013 | McNeil-Yeckel et al. |
| 8,615,939 B2 | 12/2013 | Seery et al. |
| 8,671,930 B2 | 3/2014 | Liao |
| 8,704,082 B2 | 4/2014 | Angoli et al. |
| 8,878,112 B2 | 11/2014 | Lee |
| 8,904,774 B2 | 12/2014 | Gee |
| 8,933,660 B2 | 1/2015 | Neumann et al. |
| 8,993,870 B2 | 3/2015 | Eom |
| 9,038,329 B2 | 5/2015 | Pelman et al. |
| 9,074,797 B2 | 7/2015 | Miller et al. |
| 9,166,525 B2 | 10/2015 | Grant |
| 9,188,367 B2 | 11/2015 | Jang |
| 9,443,999 B2 | 9/2016 | Polk |
| 9,531,320 B2 | 12/2016 | Gonzalez Moreno |
| 9,551,508 B2 | 1/2017 | Straeter |
| 9,568,215 B2 | 2/2017 | Patwardhan et al. |
| 9,581,678 B2 | 2/2017 | Corio |
| 9,593,867 B2 | 3/2017 | Seery et al. |
| 9,601,645 B2 | 3/2017 | Seery et al. |
| 9,727,060 B2 | 8/2017 | Coupart |
| 9,766,319 B2 | 9/2017 | Au |
| 9,831,819 B2 | 11/2017 | Kirk et al. |
| 9,863,667 B2 | 1/2018 | Au |
| 9,905,717 B2 | 2/2018 | Au |
| 9,923,510 B2 | 3/2018 | Au |
| 9,970,686 B2 | 5/2018 | Au |
| 9,998,068 B2 | 6/2018 | Au |
| 10,008,975 B2 | 6/2018 | Au |
| 10,042,030 B2 | 8/2018 | Corio |
| 10,075,125 B2 | 9/2018 | Liu et al. |
| 10,171,024 B2 | 1/2019 | Polk |
| 10,222,446 B2 | 3/2019 | Au |
| 10,340,839 B2 | 7/2019 | Almy et al. |
| 10,340,840 B2 | 7/2019 | Almy et al. |
| 10,379,193 B2 | 8/2019 | Au |
| 10,461,682 B2 | 10/2019 | Schuit et al. |
| 10,514,185 B2 | 12/2019 | Ingram |
| 10,541,644 B2 | 1/2020 | Arliaud et al. |
| 10,557,646 B1 | 2/2020 | Ma et al. |
| 10,594,253 B2 | 3/2020 | Henderson et al. |
| 10,619,891 B2 | 4/2020 | Menard |
| 10,630,231 B2 | 4/2020 | Needham et al. |
| 10,648,528 B2 | 5/2020 | Kull et al. |
| 10,654,420 B2 | 5/2020 | Levi |
| 10,684,348 B2 | 6/2020 | Arliaud et al. |
| 10,771,007 B2 | 9/2020 | Corio |
| 10,848,097 B1 | 11/2020 | Needham et al. |
| 2008/0264474 A1 | 10/2008 | Frauenknecht et al. |
| 2010/0089390 A1 | 4/2010 | Miros et al. |
| 2010/0095955 A1 | 4/2010 | Carrasco Martinez |
| 2010/0101559 A1* | 4/2010 | Grant ............... H02S 20/32 126/600 |
| 2011/0041834 A1 | 2/2011 | Liao |
| 2012/0125399 A1 | 5/2012 | Schatz et al. |
| 2012/0152310 A1 | 6/2012 | Hinman et al. |
| 2012/0152311 A1 | 6/2012 | Miller et al. |
| 2012/0174962 A1 | 7/2012 | Koningstein et al. |
| 2013/0019921 A1 | 1/2013 | Au |
| 2013/0048048 A1* | 2/2013 | Flanery ............... F24S 50/40 136/246 |
| 2013/0247962 A1 | 9/2013 | Sakai et al. |
| 2013/0319402 A1 | 12/2013 | Shaw |
| 2013/0341294 A1 | 12/2013 | Reynolds et al. |
| 2014/0224300 A1 | 8/2014 | Liu |
| 2014/0338659 A1* | 11/2014 | Corio ............... H02S 20/32 126/714 |
| 2015/0377518 A1* | 12/2015 | Maxey ............... F24S 30/425 126/714 |
| 2016/0118929 A1 | 4/2016 | Krause |
| 2016/0140283 A1 | 5/2016 | Morse et al. |
| 2016/0336900 A1* | 11/2016 | Paponneau ............ F24S 50/20 |
| 2017/0025989 A1 | 1/2017 | Shaw |
| 2017/0093329 A1 | 3/2017 | Jensen |
| 2017/0102168 A1 | 4/2017 | Childress |
| 2017/0301814 A1 | 10/2017 | Au |
| 2017/0353145 A1 | 12/2017 | Yang |
| 2018/0013380 A1 | 1/2018 | Childress et al. |
| 2018/0024222 A1 | 1/2018 | Au |
| 2018/0054156 A1 | 2/2018 | Lokey |
| 2018/0076757 A1 | 3/2018 | Gross et al. |
| 2018/0091088 A1 | 3/2018 | Barton et al. |
| 2018/0167025 A1 | 6/2018 | Au |
| 2018/0224161 A1 | 8/2018 | Au |
| 2018/0302026 A1 | 10/2018 | Basel et al. |
| 2018/0302027 A1 | 10/2018 | Betts et al. |
| 2018/0341002 A1* | 11/2018 | Augustyn ............ F24S 30/425 |
| 2018/0358921 A1 | 12/2018 | Henderson et al. |
| 2019/0036478 A1 | 1/2019 | Liu et al. |
| 2019/0131920 A1 | 5/2019 | Au |
| 2019/0199276 A1 | 6/2019 | Bailey et al. |
| 2019/0204405 A1 | 7/2019 | Arliaud et al. |
| 2019/0296686 A1 | 9/2019 | Kresse et al. |
| 2019/0296688 A1 | 9/2019 | Kresse et al. |
| 2019/0319578 A1 | 10/2019 | Needham et al. |
| 2019/0356265 A1 | 11/2019 | Liu et al. |
| 2020/0036325 A1 | 1/2020 | Poivet |
| 2020/0076356 A1 | 3/2020 | Cherukupalli et al. |
| 2020/0076359 A1 | 3/2020 | Bahn |
| 2020/0153381 A1 | 5/2020 | Michotte De Welle et al. |
| 2020/0162015 A1 | 5/2020 | Upfill-Brown et al. |
| 2020/0182513 A1 | 6/2020 | Ma et al. |
| 2020/0235696 A1 | 7/2020 | Arliaud et al. |
| 2020/0309893 A1 | 10/2020 | Arliaud et al. |

OTHER PUBLICATIONS

"Dorian Schneider, Control algorithms for large scale, single axis photovoltaic trackers, May 12, 2012, RWTH Aachen University, Germany" (Year: 2012).*

* cited by examiner

SYSTEMS AND METHODS FOR ARRAY LEVEL TERRAIN BASED BACKTRACKING

RELATED APPLICATIONS

This application is a continuation-in-part of U.S. patent application Ser. No. 16/928,679, filed Jul. 14, 2020, entitled "SYSTEMS AND METHODS FOR TERRAIN BASED BACKTRACKING FOR SOLAR TRACKERS," the entire contents and disclosure of which are hereby incorporated by reference herein in its entirety.

BACKGROUND

The field relates generally to tracking systems for adjusting solar trackers and, more specifically, to determining angles for solar trackers to maximize production and reduce shadows based on the terrain at the location of the solar tracker.

Recently, the development of a variety of energy substitution such as, a clean energy source and environment friendly energy are emerging to replace fossil fuels due to the shortage of fossil fuels, environmental contamination issues, etc. One of the solutions is to use solar energy. This type of solar energy use can be categorized into three types; one of the types converts solar energy to heat energy and uses it for heating or boiling water. The converted heat energy can also be used to operate a generator to generate electric energy. The second type is used to condense sunlight and induce it into fiber optics which is then used for lighting. The third type is to directly convert light energy of the sun to electric energy using solar cells.

Solar trackers are groups of collection devices, such as solar modules. Some solar trackers are configured to follow the path of the sun to minimize the angle of incidence between incoming sunlight and the solar tracker to maximize the solar energy collected. To face the sun correctly, a program or device to track the sun is necessary. This is called a sunlight tracking system or tracking system. The method to track the sunlight can generally be categorized as a method of using a sensor or a method of using a program.

In terms of a power generation system using solar energy, a large number of solar trackers are generally installed on a vast area of flat land to keep modules of solar trackers from overlapping. But, when multiple solar trackers are installed, shade can occur due to interference between the solar trackers, and sunlight cannot be fully absorbed when the sun does not arise above a certain angle or due to weather conditions. Furthermore, solar trackers are grouped into arrays of trackers, where multiple solar trackers are positioned from East to West along the terrain.

In addition, some solar trackers are installed in areas with changes in elevation between solar trackers. In these situations, significant shading from other trackers can occur. When the sun is at certain angles, such as just after sunrise or just before sunset, a solar tracker can interfere with the solar collection of a solar tracker multiple rows away.

BRIEF DESCRIPTION

In one aspect, a system is provided. The system includes a first tracker attached to a rotational mechanism for changing a plane of the first tracker. The first tracker is configured to collect solar irradiance. The first tracker is in an array including a plurality of trackers. The system also includes a controller in communication with the rotational mechanism. The controller includes at least one processor in communication with at least one memory device. Each tracker of the plurality of trackers is associated with a controller. The at least one processor is programmed to store, in the at least one memory device, a plurality of positional information and a shadow model for determining placement of shadows based on positions of objects relative to the sun. The at least one processor is also programmed to determine a position of the sun at a first specific point in time. The at least one processor is further programmed to retrieve, from the at least one memory device, height information for the plurality of trackers in the array. A first height of the first tracker is different than a second height of a second tracker of the plurality of trackers in the array. In addition, the at least one processor is programmed to execute the shadow model based on the retrieved height information and the position of the sun. Moreover, the at least one processor is programmed to determine a first angle for the first tracker based on the executed shadow model. Furthermore, the at least one processor is programmed to collect an angle for each tracker in the plurality of trackers in the array. In addition, the at least one processor is also programmed to adjust the first angle based on executing the shadow model with the first angle and the plurality of angles associated with the plurality of trackers in the array. In addition, the at least one processor is further programmed to transmit instructions to the rotational mechanism to change the plane of the tracker to the adjusted first angle.

In another aspect, a method for operating a first tracker in an array is provided. The method is implemented by at least one processor in communication with at least one memory device. The method includes storing, in the at least one memory device, a plurality of positional information and a shadow model for determining placement of shadows based on positions of objects relative to the sun. The method also includes determining a position of the sun at a first specific point in time. The method further includes retrieving, from the at least one memory device, height information for the first tracker and a plurality of trackers in the array. A first height of the first tracker is different than a second height of a second tracker of the plurality of trackers in the array. In addition, the method includes executing the shadow model based on the retrieved height information and the position of the sun. Moreover, the method includes determining a first angle for the first tracker based on the executed shadow model. Furthermore, the method includes collecting an angle for each tracker in the plurality of trackers in the array. In addition, the method also includes adjusting the first angle based on executing the shadow model with the first angle and the plurality of angles associated with the plurality of trackers in the array. In addition, the method further includes transmitting instructions to change a plane of the first tracker to the adjusted first angle.

In a further aspect, a controller for a first tracker in an array is provided. The controller includes at least one processor in communication with at least one memory device. The at least one processor is programmed to store, in the at least one memory device, a plurality of positional information and a shadow model for determining placement of shadows based on positions of objects relative to the sun. The at least one processor is also programmed to determine a position of the sun at a first specific point in time. The at least one processor is further programmed to retrieve, from the at least one memory device, height information for the first tracker and a plurality of trackers in the array. A first height of the first tracker is different than a second height of a second tracker of the plurality of trackers in the array. In addition, the at least one processor is programmed to execute the shadow model based on the retrieved height information and the position of the sun. Moreover, the at least one processor is programmed to determine a first angle for the first tracker based on the executed shadow model. Furthermore, the at least one processor is programmed to collect an angle for each tracker in the plurality of trackers in the array. In addition, the at least one processor is also programmed to adjust the first angle based on executing the shadow model with the first angle and the plurality of angles associated with the plurality of trackers in the array. In addition, the at least one processor is further programmed to transmit instructions to a rotational mechanism connected to the first tracker to change a plane of the first tracker to the adjusted first angle.

BRIEF DESCRIPTION OF THE DRAWINGS

Corresponding reference characters indicate corresponding parts throughout the drawings.

DETAILED DESCRIPTION

The systems and processes are not limited to the specific embodiments described herein. In addition, components of each system and each process can be practiced independent and separate from other components and processes described herein. Each component and process also can be used in combination with other assembly packages and processes.

Figure 1:
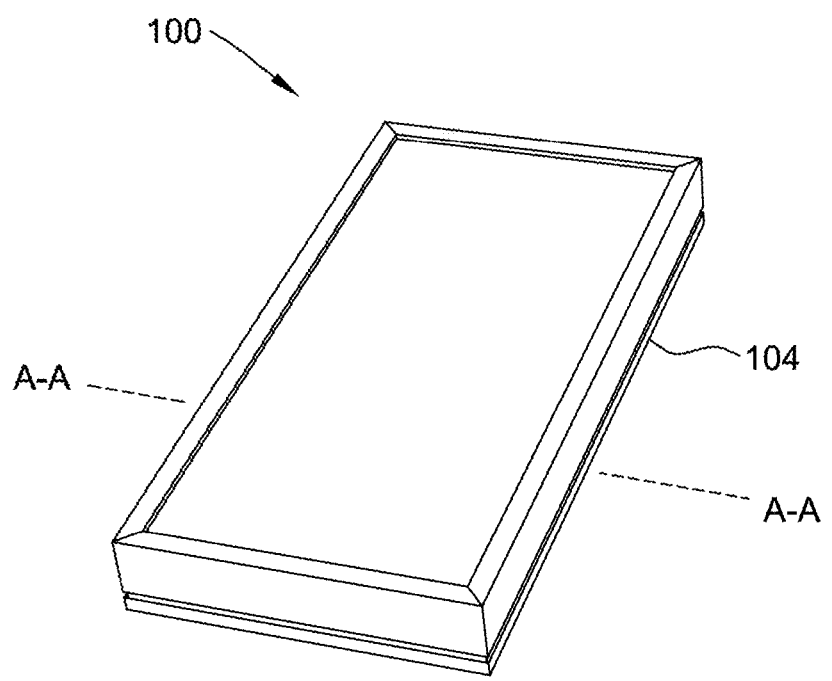
FIG. 1 is a perspective view of a solar module of a solar tracker.
Figure 2:
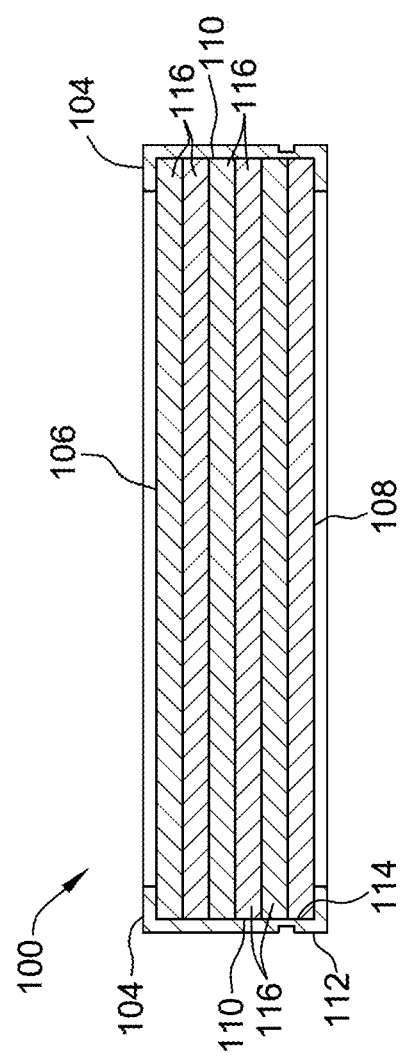
FIG. 2 is a cross-sectional view of the solar module taken along line A-A of FIG. 1.

FIG. 1 is a perspective view of a solar module 100 of a solar tracker. FIG. 2 is a cross-sectional view of the solar module 100 (shown in FIG. 1) taken along line A-A of FIG. 1.

The module 100 includes a top surface 106 and a bottom surface 108. Edges 110 extend between the top surface 106 and the bottom surface 108. Module 100 is rectangular shaped. In other embodiments, module 100 may have any shape that allows the module 100 to function as described herein.

A frame 104 circumscribes and supports the module 100. The frame 104 is coupled to the module 100, for example as shown in FIG. 2. The frame 104 protects the edges 110 of the module 100. The frame 104 includes an outer surface 112 spaced from one or more layers 116 of the module and an inner surface 114 adjacent to the one or more layers 116. The outer surface 112 is spaced from, and substantially parallel to, the inner surface 114. The frame 104 may be made of any suitable material providing sufficient rigidity including, for example, metal or metal alloys, plastic, fiberglass, carbon fiber, and other material capable of supporting the module 100 as described herein. In some embodiments, the frame is made of aluminum, such as 6000 series anodized aluminum.

In the illustrated embodiment, the module 100 is a photovoltaic module. The module 100 has a laminate structure that includes a plurality of layers 116. Layers 116 include, for example, glass layers, non-reflective layers, electrical connection layers, n-type silicon layers, p-type silicon layers, backing layers, and combinations thereof. In other embodiments, the module 100 may have more or fewer layers 116 than shown in FIG. 2, including only one layer 116. The photovoltaic module 100 may include a plurality of photovoltaic modules with each module made of photovoltaic cells.

In some embodiments, the module 100 is a thermal collector that heats a fluid such as water. In such embodiments, the module 100 may include tubes of fluid which are heated by solar radiation. While the present disclosure may describe and show a photovoltaic module, the principles disclosed herein are also applicable to a solar module 100 configured as a thermal collector or sunlight condenser unless stated otherwise.

Figure 3:
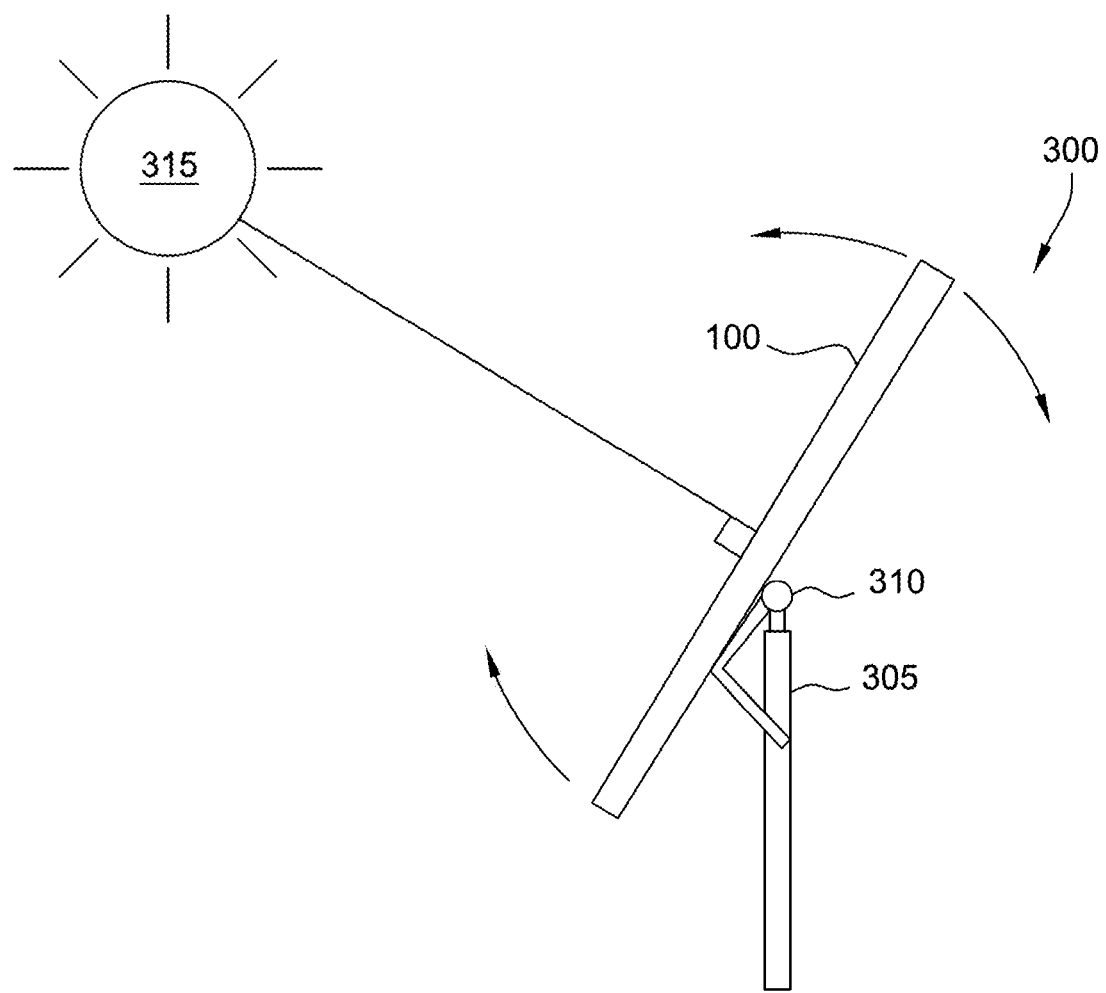
FIG. 3 is a side view of a solar tracker in accordance with at least one embodiment.

FIG. 3 is a side view of a tracker 300 in accordance with at least one embodiment. Tracker 300 includes a plurality of modules 100 (shown in FIG. 1). The tracker 300 (also known as a tracker row) controls the position of a plurality of modules 100. The tracker 300 includes support columns 305 and one or more rotational mechanisms 310. The rotational mechanism 310 is configured to rotate the tracker 300 to track the sun 315 as described herein. In the example, the rotational mechanism 310 rotates the tracker 300 along a single axis from −60 degrees to 60 degrees, where 0 degrees is horizontal. Rotation mechanism 310 can be any rotational mechanism 310 able to move the tracker 300 between angles as described herein. The rotational mechanism 310 can include, but is not limited to, linear actuators and slew drives.

The tracker 300 can include a single module or a plurality of modules 100. The tracker 300 can also include an entire row of modules 100 positioned side-by-side. Or any other combination of modules 100 that allows the tracker 300 to work as described herein.

Figure 4:
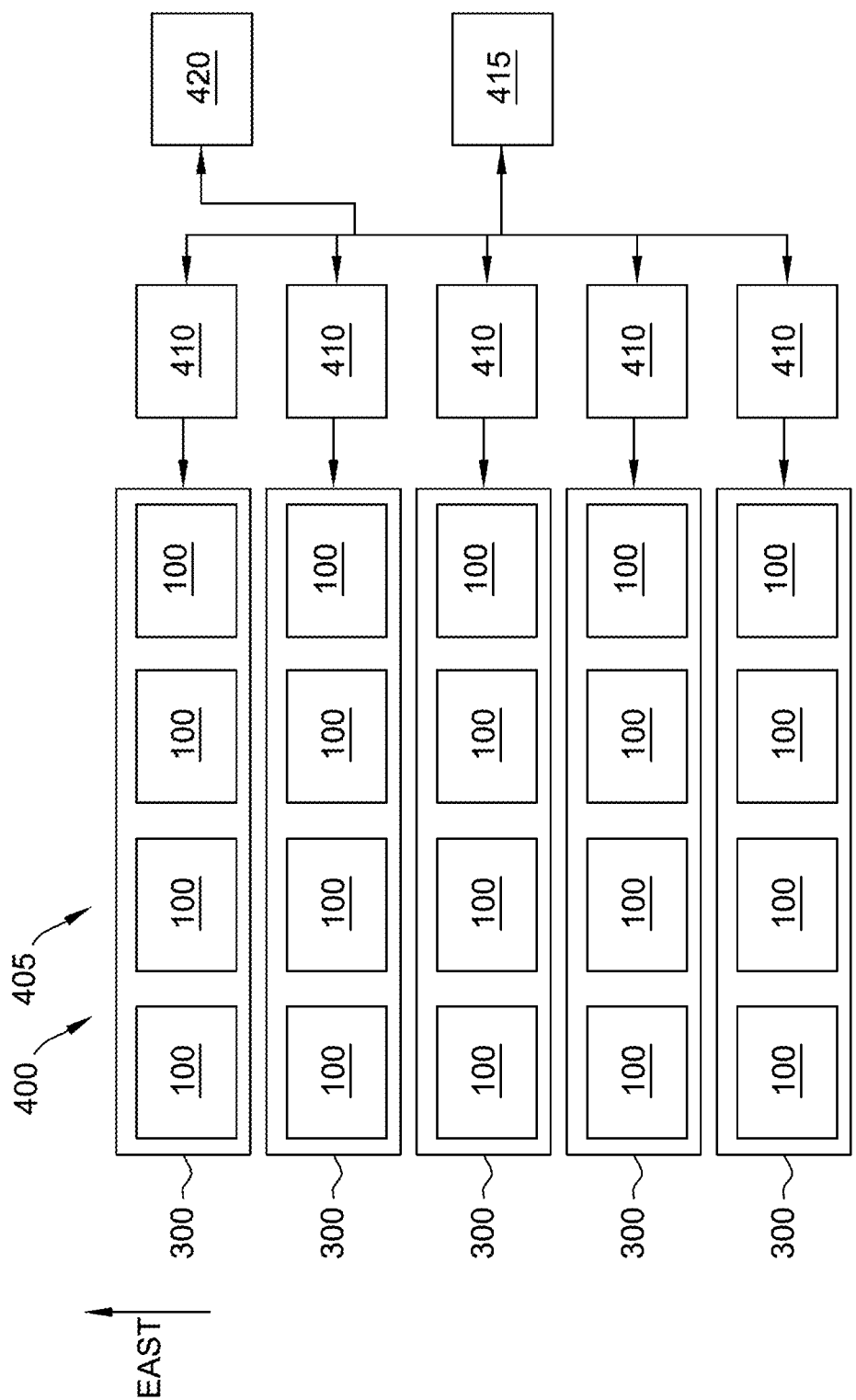
FIG. 4 is an overhead view of an example solar array at a solar site.

FIG. 4 is an overhead view of an example solar array 400 at a solar site 405. The solar array 400 includes a plurality of trackers 300, where each tracker 300 includes a plurality of modules 100 positioned in a row. The solar site 405 includes a plurality of solar arrays 400. The trackers 300 are configured to rotate so that the top surface 106 (shown in FIG. 2) of each tracker is perpendicular to the angle of the sun 315 (shown in FIG. 3).

The position of each tracker 300 is controlled by a row controller 410. The row controller 410 calculates the angle for the modules 100 in the tracker 300 and instructs a rotational mechanism 310 (shown in FIG. 3) to move the tracker 300 to that angle. The rotational mechanism 310 can be capable of moving a tracker 300, which can consist of a single module 100, an entire row of modules 100, or a portion of a row of modules 100. A tracker 300 can include multiple rotational mechanisms 310. A single rotational mechanism 310 can adjust multiple trackers 300.

The row controller 410 of this embodiment is in communication with a site controller 415. The site controller 415 can provide information to the row controller 410 such as, but not limited to, weather information, forecast information, sun position information, and other information to allow the row controller 410 to operate as described herein. In some embodiment, site controller 415 may only be an array zone controller, which controls and sends information to a plurality of row controllers 410 in an array 400, but is only in communication with a portion of the row controllers at the site 405.

The row controller 410 and/or the site controller 415 are in communication with one or more sensors 420 located at the solar site 405. The one or more sensors 420 measure conditions at the solar site 405.

The row controller 410 is programmed to determine the position of the sun and the corresponding angle of the trackers 300 in this embodiment. For each tracker 300, the row controller 410 determines the sun's position with respect to the center of the tracker 300. The row controller 410 stores the latitude, longitude, and altitude of the tracker 300. In at least one embodiment, the row controller 410 calculates the current position of the sun using the National Renewable Energy Lab's (NREL) equations to calculate the sun's position at any given point in time. In alternative embodiments, the row controller 410 is in communication with one or more sensors 420 capable of determining the sun's current position. The row controller 410 is programmed to maximize the energy yield for the trackers 300 by minimizing the angle between the sun vector and the normal vector of the plane of the tracker 300.

The row controller 410 instructs the rotational mechanism 310 to adjust the plane of the tracker 300, so that the plane of the tracker 300 does not deviate by more than +/−1 degree while tracking the sun. In some embodiments, the row controller 410 provides a step size to the angle of the plane of the tracker 300 of two degrees. This means that the row controller 410 adjusts the plane of the tracker 300 for every two degrees the sun moves. The row controller 410 can adjust the angle of the plane of the tracker 300 by any amount, limited by the mechanical tolerances of the tracker 300 and the rotational mechanism 310. In some embodiments, the row controller 410 instructs the rotation mechanisms 310 to adjust each tracker 300 individually, where trackers 300 in the same row may be adjusted to different angles. In other embodiments, the row controller 410 transmits instructions to the trackers 300 in a single row that all of the trackers 300 in that row should be adjusted to the same angle. In some further embodiments, the row controller 410 may transmit instructions to trackers 300 in different rows. For example, a row controller 410 may control trackers 300 in two adjacent rows.

Figure 5:
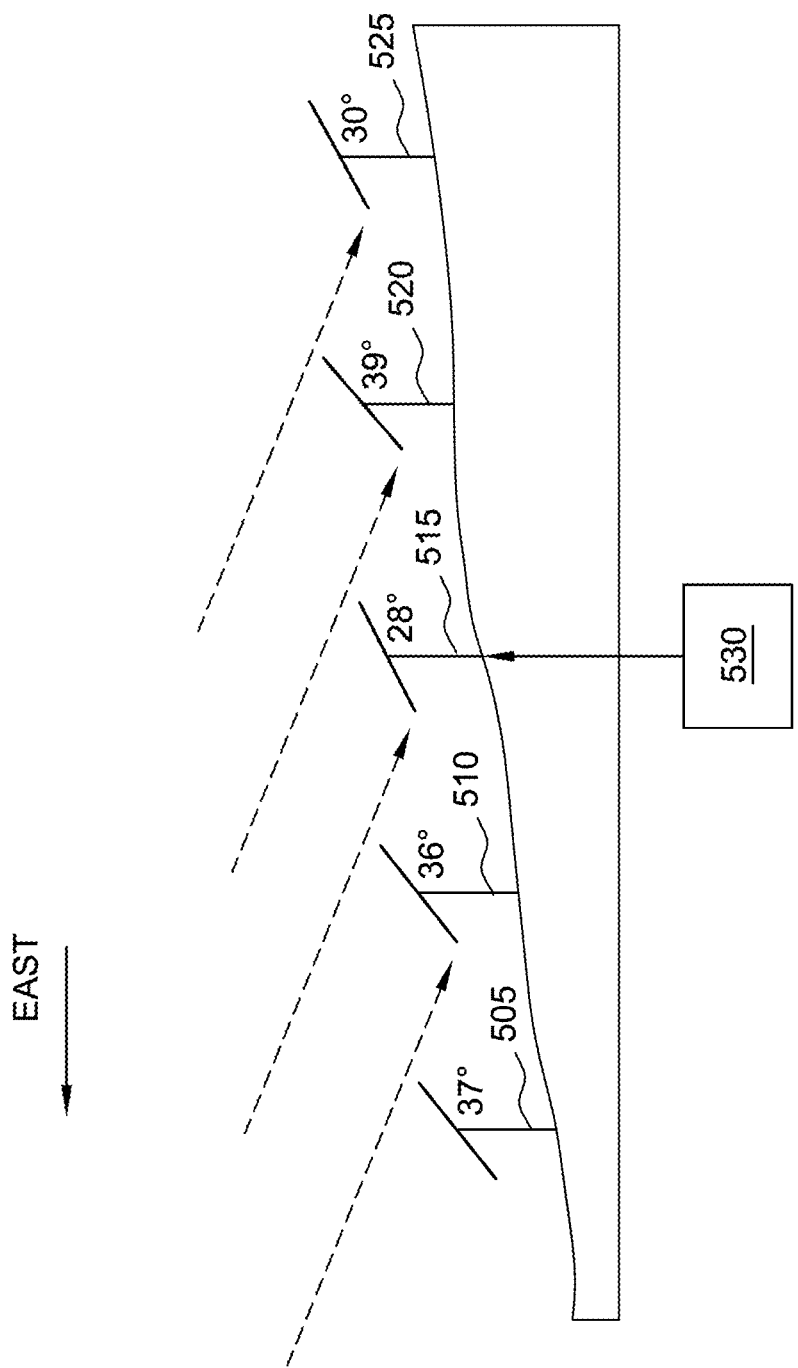
FIG. 5 illustrates a plurality of solar trackers shown in FIG. 3 on uneven terrain during backtracking.

FIG. 5 illustrates a plurality of trackers 300 (shown in FIG. 3) on uneven terrain during backtracking. During the early hours and late hours of the day, the sun 315 (shown in FIG. 3) is low on the horizon. This can cause shadows to appear on various trackers 300 because of the angle required for the plane of the tracker 300 to be normal to the angle of the sun 315.

Backtracking is an algorithm for calculating the optimum angles for the plurality of trackers 300 to prevent shadows during tracking. In the illustrated embodiment, the backtracking algorithm is executed by the row controller 410 (shown in FIG. 4). The backtracking algorithm considers eastward and westward terrain slope to determine the angle for the tracker 300 for shadow-free tracking. The backtracking algorithm uses a mathematical model of the tracker 300 to calculate and update the backtracking angles for every two degrees of the sun's movement. While the predetermined threshold is described as two degrees herein, any predetermined threshold can be used depending on how often the users desire the tracker's angle to be updated.

For calculating the optimal angle, the backtracking algorithm takes into consideration the width of the tracker 300, the distance between adjacent rows of trackers 300, the difference in elevation between the different rows of trackers 300, the current angle of the tracker 300, and the angle of the sun 315. The row controller 410 calculates the backtracking angles for the trackers 300 its row. The row controller 410 uses the backtracking algorithm to maximize the energy yield for the trackers 300 by minimizing the angle between the sun vector and the normal vector of the plane of the tracker 300 while also minimizing the shadows cast by the adjacent trackers 300.

More specifically, FIG. 5 illustrates five different trackers A-E 505, 510, 515, 520, and 525. Each of the five trackers A-E 505, 510, 515, 520, and 525 is associated with a different row. For this example, each of the five trackers A-E 505, 510, 515, 520, and 525 is currently facing in an easterly direction towards the sun 315 (shown in FIG. 3). In addition, each of the five trackers A-E 505, 510, 515, 520, and 525 are positioned at a different elevation. The different elevation could cause shading issues at certain times of day.

To account for the terrain, the row controller 410 executes a terrain based backtracking algorithm to determine an optimal angle for the tracker(s) 300 in its row based on the terrain information for the row in question and the adjacent rows to the east and the west of the row in question.

During morning backtracking, the row controller 410 sets the angle of the tracker 300 so that the shadow from an eastern, adjacent tracker 300 will come as close as possible to the lower edge of the tracker 300 in question as possible. This is because in the morning, the sun 315 is rising, so the gap between the shadow and the tracker 300 increases over time. Every time the row controller 410 adjusts the angle of the tracker 300, the shadow moves back to as close as possible to the bottom edge of the tracker 300.

During afternoon backtracking, the row controller 410 sets the angle of the tracker 300 so that the shadow from a western, adjacent tracker 300 has a gap between the shadow cast by the adjacent tracker 300 and the bottom of the tracker 300 in question. Since the sun 315 is setting, the gap will decrease over time. The goal is to have the gap disappear by the time the sun 315 has moved enough that the row controller 410 needs to move the tracker 300 again.

The row controller 410 stores the terrain information for each row including the top-of-post heights of the trackers 300 in each row. The row controller 410 also stores the size of the tracker 300 and the spacing between the rows, including any variable spacing between the rows. Other information stored by the row controller 410 includes, but is not limited to, the latitude, longitude, and altitude of the site, the current time, and the current sun position based on the exact date, time, latitude, longitude, and altitude. The row controller 410 uses this information to model shadows to compute the exact shadow regions that will be made by the current row and the adjacent rows. The row controller 410 determines the plane of the array for each of the adjacent rows. Then the row controller 410 uses the determined planes of array for the adjacent rows to determine the plane of array for the current row. Each of the planes of arrays are calculated to maximize the amount of solar irradiance collected while minimizing the amount of shadow received and projected onto other trackers 300.

For example, tracker C 515 is associated with row controller C 530, which is similar to row controller 410. Row controller C 530 stores the top of post heights of and the distances between the trackers B, C, and D 510, 515, and 520. Based on the relative post heights of the three trackers B, C, and D 510, 515, and 520, the distance between their corresponding rows, the sizes of the three trackers B, C, & D 510, 515, and 520, the current position of the sun 315 based on the current time and the physical location of the three trackers B, C, and D 510, 515, and 520, and one or more future positions of the sun 315, the row controller C 530 is able to determine an optimal angle to set tracker C 515 to and instructs the associated rotational mechanism 310 (shown in FIG. 3) to set the tracker to that optimal angle. In at least one embodiment, the row controller 410 determines the angles for the plane of arrays for trackers B, C, and D 510, 515, and 520 as if the angles for all three are the same as each other.

All of the trackers 300 in a single row are at the same elevation in this embodiment. In alternative embodiments, some of the trackers 300 in a row are at different elevations. In these alternative embodiments, the corresponding row controller 410 calculates the angles for the trackers 300 either individually or in groups by elevation. This can include calculating the angles in groups based on the varying elevations of the adjacent rows. In some embodiments with varying elevations, the row controller 410 can use the average elevation, the lowest elevation, and/or a combination thereof to calculate the angle for the tracker 300.

Figure 6:
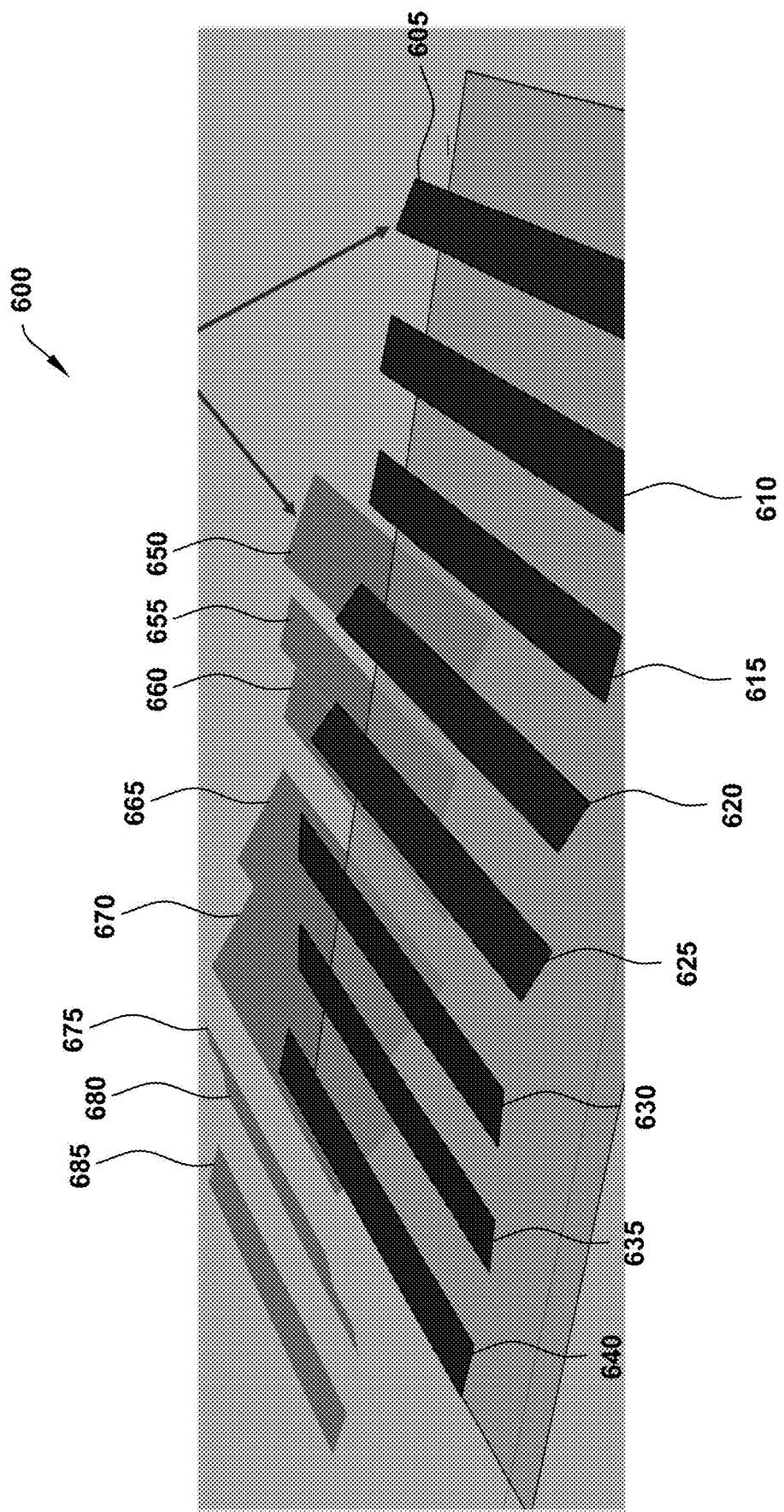
FIG. 6 illustrates shadows cast by an array of solar trackers such as those shown in FIG. 5.

FIG. 6 illustrates shadows cast by an array 600 of solar trackers 300 (shown in FIG. 3) such as those shown in FIG. 5.

Array 600 includes a plurality of trackers 605-640. FIG. 6 also illustrates a plurality of shadows 650-685 cast by the plurality of trackers 605-640.

As shown in FIG. 6, a shadow 650 cast by a tracker 605 may affect the performance of tracker 620 that is a distance away from the casting tracker 605. Accordingly, the row controller 410 needs to account for the shadows that affect trackers one or more rows away. This may occur during periods where the sun is particularly low in the horizon, such as early morning or late afternoon. This also may occur when the different trackers 605-640 are at different altitudes based on their terrain. For example, a tracker 300 may be in a gully or depression in the terrain and be more susceptible to being blocked by higher altitude trackers 300.

Figure 7:
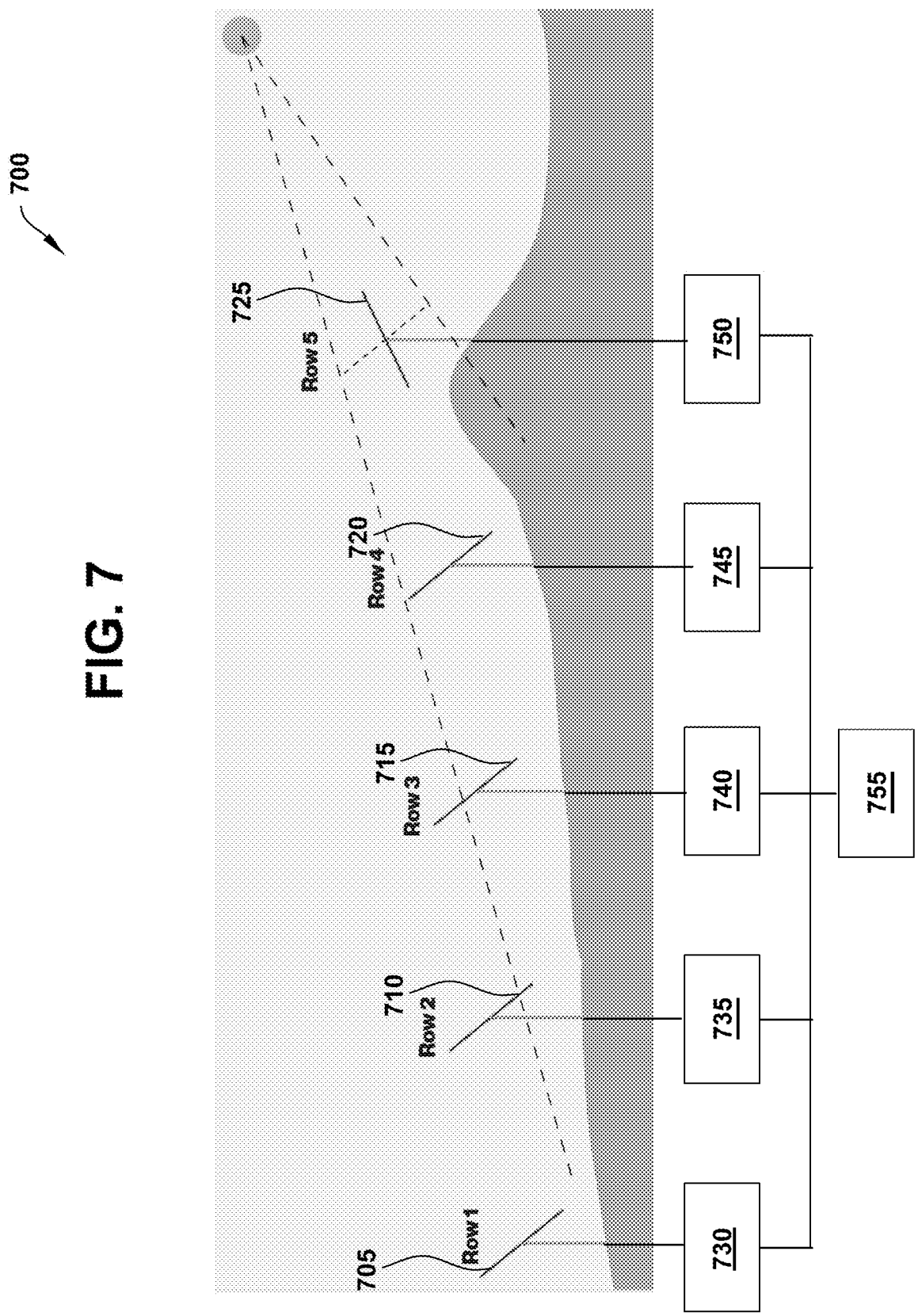
FIG. 7 illustrates another plurality of solar trackers in an array on uneven terrain during backtracking.

FIG. 7 illustrates another plurality of solar trackers 300 (shown in FIG. 3) in an array 700 on uneven terrain during backtracking. During the early hours and late hours of the day, the sun 315 (shown in FIG. 3) is low on the horizon. This can cause shadows to appear on various trackers 300 because of the angle required for the plane of the tracker 300 to be normal to the angle of the sun 315.

Backtracking is an algorithm for calculating the optimum angles for the plurality of trackers 300 to prevent shadows during tracking. However, in some cases the sun 315 is at such an angle that shadows from a tracker 300 impact a tracker multiple rows away from the tracker 300 casting the shadow. To mitigate this issue the row controllers 410 (shown in FIG. 4) can communicate to coordinate to maximize the amount of solar irradiance collected for the array 700 as a whole.

In the array 700 shown in FIG. 7, there are five rows of trackers 705-725, each with their own row controller 730-750. In some embodiments, the row controllers 730-750 are in communication with an array controller 755.

The backtracking algorithm is executed by each row controller 730-750. The backtracking algorithm considers eastward and westward terrain slope to determine the angle for the tracker 300 for shadow-free tracking. The backtracking algorithm uses a mathematical model of the tracker 300 to calculate and update the backtracking angles for every two degrees of the sun's movement. While the predetermined threshold is described as two degrees herein, any predetermined threshold can be used depending on how often the users desire the tracker's angle to be updated.

For calculating the optimal angle, the backtracking algorithm takes into consideration the width of the tracker 300, the distance between the rows of trackers 705-725, the difference in elevation between the different rows of trackers 705-725, the current angle of each tracker 705-725, and the angle of the sun 315. The row controller 410 calculates the backtracking angles for the trackers 300 its row. The corresponding row controller 730-750 uses the backtracking algorithm to maximize the energy yield for the trackers 705-725 by minimizing the angle between the sun vector and the normal vector of the plane of the tracker 300 while also minimizing the shadows cast by the other trackers 705-725 in the array 700.

During morning backtracking, the row controller 730-750 sets the angle of each tracker 300 so that the shadow from an eastern, adjacent tracker 300 will come as close as possible to the lower edge of the tracker 300 in question as possible. This is because in the morning, the sun 315 is rising, so the gap between the shadow and the tracker 300 increases over time. Every time the row controller 730-750 adjusts the angle of the tracker 300, the shadow moves back to as close as possible to the bottom edge of the tracker 300.

During afternoon backtracking, the row controller 730-750 sets the angle of each tracker 300 so that the shadow from a western, adjacent tracker 300 has a gap between the shadow cast by the adjacent tracker 300 and the bottom of the tracker 300 in question. Since the sun 315 is setting, the gap will decrease over time. The goal is to have the gap disappear by the time the sun 315 has moved enough that the row controller 730-750 needs to move the tracker 300 again.

However, at some angles and some relative elevations, a single tracker 300 can shade more than one other row of trackers 705-725. More specifically, FIG. 7 illustrates five different rows of trackers 1-5 705, 710, 715, 720, and 725. Each of the five rows of trackers 1-5 705, 710, 715, 720, and 725 is associated with a different row. For this example, each of the five rows of trackers 1-5 705, 710, 715, 720, and 725 is currently facing in a westerly direction towards the sun 315 (shown in FIG. 3). In addition, each of the five rows of trackers 1-5 705, 710, 715, 720, and 725 are positioned at different elevations. The differences in elevations could cause shading issues at certain times of day. For example, if tracker row 5 725 was positioned so that the tracker 300 was normal to the position of the sun 315 as is currently shown in FIG. 7, multiple other trackers would be shaded. In this example tracker row 4 720 would be completely shaded, tracker row 3 715 would be mostly shaded and a portion of tracker row 2 710 would be shaded as well. Accordingly, more irradiance would be lost than would be gained by having tracker row 5 725 normal to the vector of the position of the sun 315.

To account for the terrain and the other rows of trackers 705-725, each row controller 730-750 executes an array level terrain based backtracking algorithm to determine an optimal angle for the rows of tracker(s) 705-725 based on the terrain information for the row in question and the other rows of trackers 705-725 to the east and the west of the row in question.

In the array level terrain based backtracking algorithm, the row controller 730-750 stores the terrain information for each row of trackers 705-725 including the top-of-post heights of the trackers 300 in each row of trackers 705-725. The row controller 730-750 also stores the size of the tracker 300 and the spacing between the rows, including any variable spacing between the rows. Other information stored by the row controller 730-750 includes, but is not limited to, the latitude, longitude, and altitude of the site, the current time, and the current sun position based on the exact date, time, latitude, longitude, and altitude. The row controller 730-750 uses this information to model shadows to compute the exact shadow regions that will be made by the current row and the adjacent rows.

In the array level terrain based backtracking algorithm, each tracker controller 730-750 determines the optimal angle for each row of trackers 705-725. The optimal angle for each tracker 705-725 is the angle that provides the maximum irradiance collected, which is usually the angle that is closest normal to the vector of the sun 315. In other embodiments, the tracker controller 730-750 calculates an angle where the shadow cast by the row of trackers 705-720 in question is cast at the base of the adjacent row of trackers 705-725. In this embodiment, the row controller 730-750 assumes that the starting position of the adjacent rows of trackers 705-725 is the same as the row of trackers 705-725 in question. In some embodiments, the row controller 730-750 determines the plane of the array for each of the adjacent rows. Then the row controller 730-750 uses the determined planes of array for the adjacent rows to determine the plane of array for the current row. Each of the planes of arrays are calculated to maximize the amount of solar irradiance collected while minimizing the amount of shadow received and projected onto other trackers 300.

The row controllers 730-750 then communicate their angle with the rest of the row controllers 730-750 and each receive the angles for each of the other rows of trackers 705-725. Then the row controller 730-750 executes a shadow model to determine the shadows being cast by its row of trackers 705-725 and the shadows being cast by other rows of trackers 705-725 based on the provided angles, and how those shadows may impact the irradiance collected by the row of trackers 705-725 in question.

Each row controller 730-750 then calculates a new angle for its row of trackers 705-725 based on the shadows that its row of trackers 705-725 would cast and the shadows cast by other rows of trackers 705-725 to maximize the amount of irradiance collected for the array 700 as a whole. The row controllers 730-750 report these new angles to each of the other row controllers 730-750. Each row controller 730-750 will repeatedly calculate a new angle for its row of trackers 705-725 based on the reported angles of the other rows of trackers 705-725. In some embodiments, this process is repeated until a maximum amount of irradiance is determined based on the angles of the rows of trackers 705-725 and the shadows that they cast. In the example embodiment, the process is repeated multiple times until optimal angles are determined for each of the rows of trackers 705-725 for each angle of the sun 315 desired. For example, the process can be repeated for every two degrees that the sun 315 moves or another predetermined threshold based on the user's preferences.

In some embodiments, the row controller 730-750 determines that a row of trackers 705-725 is a lost cause, such as when a row of trackers 705-725 is in a gully, surrounded by hills, or just having a higher elevation row of trackers 705 between it and the sun 315. If the row of trackers 705 is determined to be a lost cause, the row of trackers 705-725 in question will be set to a horizontal position, i.e., at an angle of zero degrees. For example, row of trackers 4 720 may be determined to be a lost cause because of the shadows cast by row of trackers 5 725. In this example, row of trackers 4 720 is set to angle zero. Then, the row of trackers 5 725 may be set at an angle that is fully normal to the vector of the sun 315 or as close as possible without casting shade on row of trackers 3 715. Row of trackers 5 725 can also be set to an angle that casts a shadow at the bottom of row of trackers 3 715 to allow that row of trackers 3 715 to not be shaded and to also maximize the amount of irradiance collected. The row of trackers 705-725 can maximize the irradiance collected by positioning the tracker 300 at an angle as close to normal to the sun 315 as possible without encountering shade. However, the amount of shading caused may reduce the overall amount of irradiance collected.

In some other embodiments, the process is performed by the array controller 755. The array controller 755 stores the elevation and spacing information for the rows of trackers 705-725 that make up the array 700. Based on the angle of the sun 315, the array controller 755 uses the shadow model to determine the angles for each of the rows of trackers 705-725 that maximizes the amount of solar irradiance collected by the array 700 as a whole. This can mean that to maximize the total irradiance collected by the array 700, one or more rows of trackers 705-725 may be set to not directly collect irradiance, such as row of trackers 4 720 in FIG. 7. In these embodiments, the array controller 755 can replace the row controllers 730-750. The array controller 755 can also be in communication with the row controllers 730-750 to determine the current angle for each row of trackers 705-725 and to instruct the row controllers 730-750, which angle to set each row of trackers 705-725 to.

In some further embodiments, rather than setting the angle of a lost cause row of trackers 705-725 to zero, the angle is set to match the angle of the sun 315 to provide a minimum amount of shadow on the other rows of trackers 705-725. For example, the row controllers 730-750 and/or the array controller 755 determine that if row 5 of trackers 725 is turned towards the sun 315, then the row 5 trackers 725 will block multiple rows of trackers 725 from collecting solar irradiance. The row controllers 730-750 and/or the array controller 755 determine that the amount of solar irradiance lost is greater than the amount of irradiance collected by the plane of row 5 of trackers 725 being normal to the angle of the sun 315. In this situation, the row controllers 730-750 and/or the array controller 755 can set row 5 of trackers 725 to an angle equal to or close to the angle of the sun 315. In this way, the row 5 of trackers 725 provides a minimum amount of shade to the other rows of trackers 7-5-720.

Figure 8:
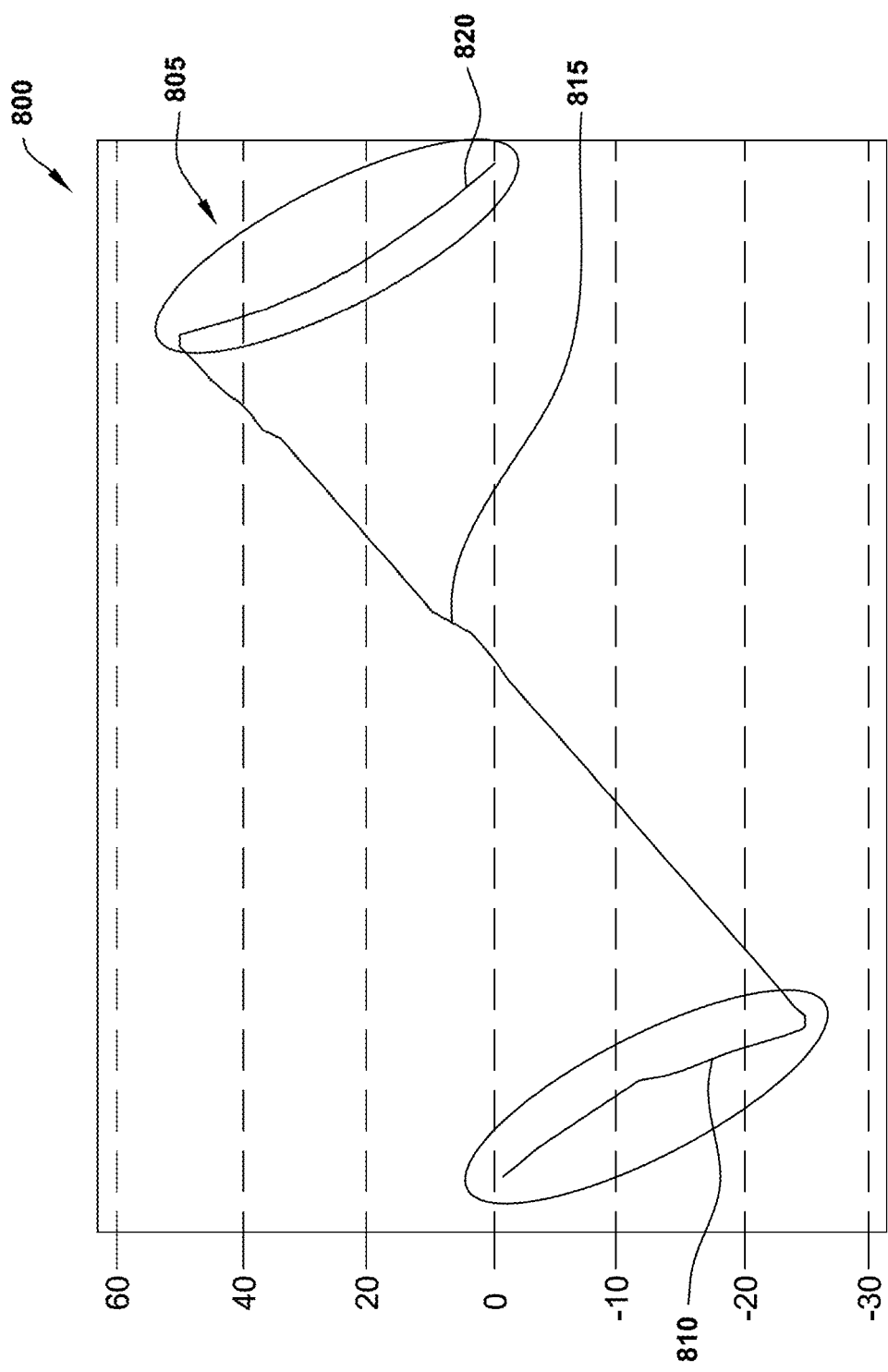
FIG. 8 illustrates an example graph of the angles for the plane of the tracker shown in FIG. 3 over the period of one day.

FIG. 8 illustrates an example graph 800 of the angles for the plane of the tracker 300 (shown in FIG. 3) over the period of one day. Line 805 illustrates the angles of the tracker 300 during a single day. At the beginning of the day, the tracker 800 is positioned using morning backtracking 810. During the majority of the day, the tracker 300 is positioned using the normal algorithm 815. At the end of the day, the tracker 300 is positioned using evening backtracking 820.

Figure 9:
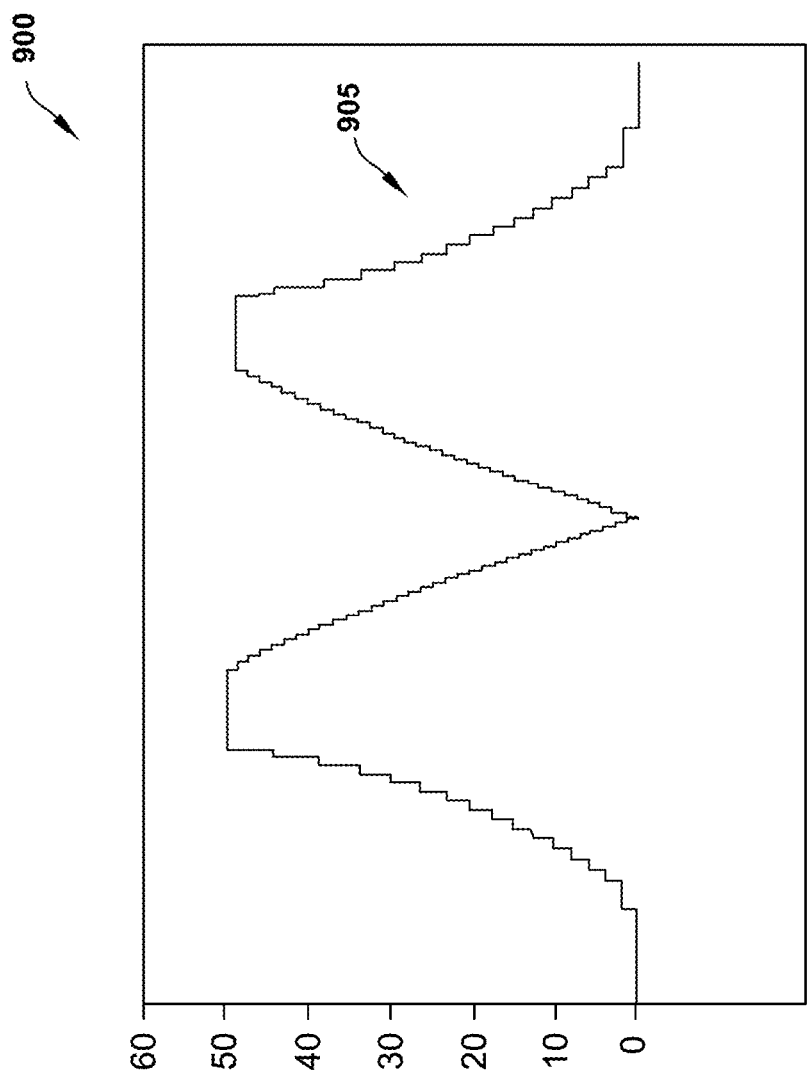
FIG. 9 illustrates another graph of the angles for the plane of the tracker shown in FIG. 3 over the period of one day.

FIG. 9 illustrates another graph 900 of the angles for the plane of the tracker 300 (shown in FIG. 3) over the period of one day. Line 905 illustrates the absolute value of the angle. In the embodiment shown in FIG. 9, the tracker 300 is stored in the horizontal position overnight.

Figure 10:
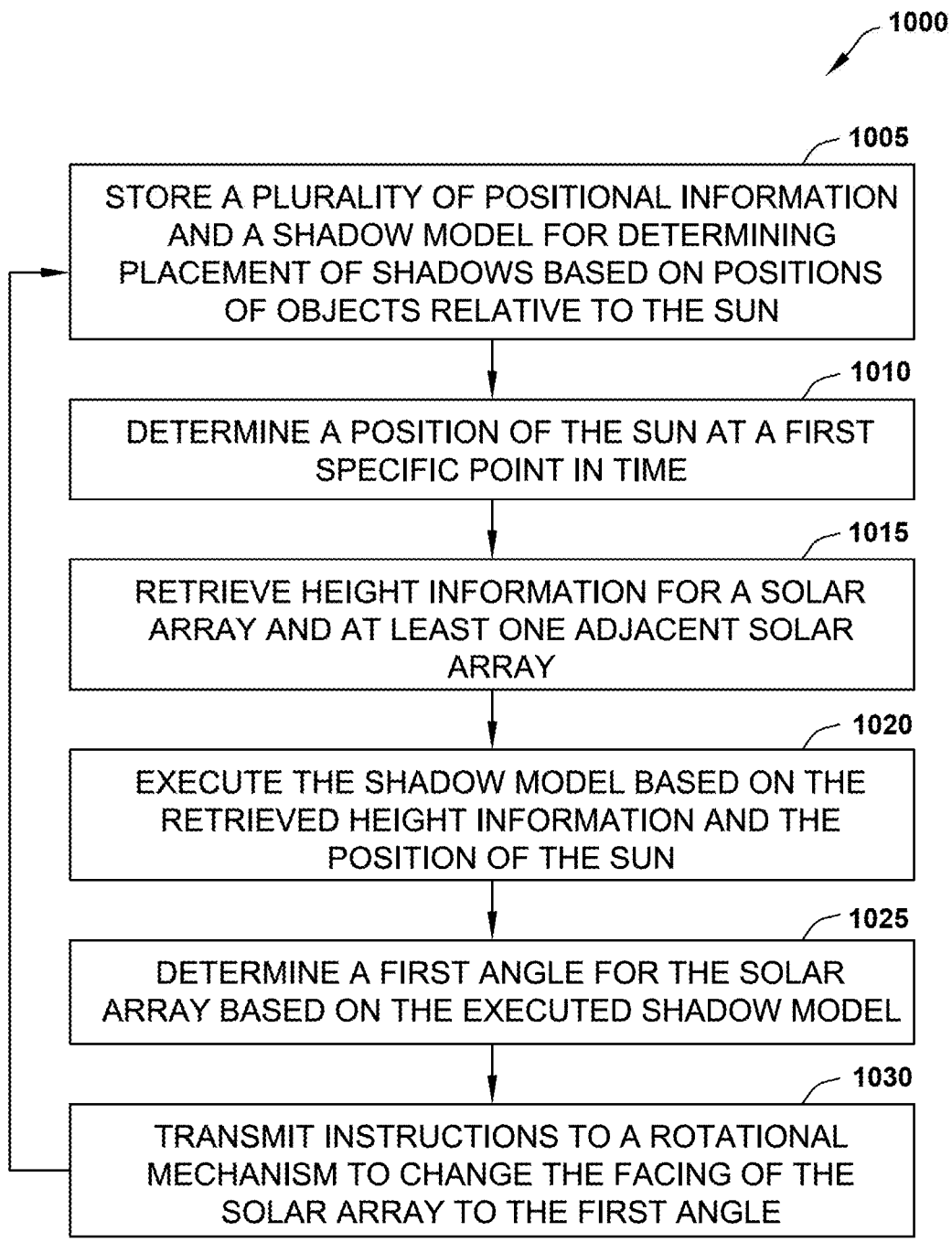
FIG. 10 illustrates a process for performing backtracking on a single tracker.

FIG. 10 illustrates a process 1000 for performing backtracking. In this embodiment, process 1000 is performed by the row controller 410 (shown in FIG. 4) controlling a single tracker 300 (shown in FIG. 3), such as tracker C 515 (shown in FIG. 5).

The row controller 410 stores 1005, in at least one memory device, a plurality of positional information and a shadow model for determining placement of shadows based on positions of objects relative to the sun 315 (shown in FIG. 3).

The row controller 410 determines 1010 a position of the sun 315 at a first specific point in time. The row controller 410 retrieves 1015, from the at least one memory device, height information for the tracker C 515 and at least one adjacent tracker 300, such as tracker B 510 (shown in FIG. 5). A first height of the tracker 300 is different than a second height of the at least one adjacent tracker 300, such as trackers B & C 510 and 515. Both heights are based on the top of support column 305 (shown in FIG. 3) of the corresponding tracker 300. In some embodiments, the support column 305 is the same height for each tracker 300, but the relative heights of the tops of the support columns 305 is based on the terrain in which the support columns 305 are placed. In other words, a difference in the first height of the tracker 300 and a second height of the at least one adjacent tracker 300 is based on terrain where the individual tracker 300 is positioned. In this embodiment, the tracker 300 is a first tracker 300, wherein the at least one adjacent tracker 300 includes a second tracker 300 and a third tracker 300, such as trackers B & D 510 and 520 respectively, where tracker C 515 is the first tracker 300. The second tracker 300 is positioned east of the first tracker 300 and the third tracker 300 is positioned west of the first tracker 300. The first tracker 300 is in a first row. The second tracker is in a second row. The third tracker 300 is in a third row.

The row controller 410 executes 1020 the shadow model based on the retrieved height information and the position of the sun 315. The row controller 410 determines 1025 a first angle for the tracker 300 based on the executed shadow model. In executing the shadow model, the row controller 410 determines a first position of a first shadow cast by the second tracker 300 (aka tracker B 510). The row controller 410 can also determine a second position of a second shadow cast by the third tracker (aka tracker D 520). The row controller 410 determines the first angle for the first tracker 300 (aka tracker C 515) to avoid the first shadow and/or the second shadow.

In executing the shadow model, the row controller 410 also determines a third position of a third shadow cast by the first tracker 300 (aka tracker C 515). The row controller 410 determines the first angle for the first tracker 300 (aka tracker C 515) to avoid casting the third shadow on at least one of the second tracker 300 (aka tracker B 510) and the third tracker 300 (aka tracker D 520). In this embodiment, the row controller 410 only executes the shadow model and the backtracking process 1000 when the sun 315 is low in the sky, such as when the angle between the sun 315 and a horizon is below a predetermined threshold. In alternative embodiments, the predetermined threshold is based on the second height of the at least one adjacent tracker 300.

The row controller 410 transmits 1030 instructions to the rotational mechanism 310 associated with the tracker 300 to change the plane of the tracker 300 to the first angle. The plane of the tracker 300 is considered the top surface 106 (shown in FIG. 2) of the tracker 300. In some embodiments, the row controller 410 instructs every tracker 200 in the plurality of trackers 300 to the first angle.

Each tracker 300 of the plurality of trackers 300 includes a rotational mechanism 310 and the row controller 410 transmits instructions to each of the plurality of rotational mechanisms 310 to change the plane of the corresponding tracker 300 to the first angle in this embodiment. In alternative embodiments, the rotational mechanism 310 is attached to each tracker 300 of the plurality of trackers 300 and the row controller 410 instructs the rotational mechanism 310 to change the plane of the plurality of trackers 300 to the first angle.

The row controller 410 determines a second position of the sun 315 at a second specific point in time. The row controller 410 executes the shadow model based on the retrieved height information and the second position of the sun 315. The row controller 410 determines a second angle for the tracker 300 based on the executed shadow model. The row controller 410 transmits instructions to the rotational mechanism 310 to change the facing of the tracker 300 to the second angle. Steps 1005 through 1030 are repeated continuously during the backtracking process 1000.

The row controller 410 repeats steps 1005 to 1030 to change the plane of the tracker 300 once the sun 315 has moved a predetermined amount. The row controller 410 determines if a difference between the position of the sun 315 and the second position of the sun 315 exceeds a predetermined threshold. This can be based on a change in angle of the sun 315 or after a specific amount of time has passed. If the difference exceeds the predetermined threshold, the row controller 410 transmits instructions to the rotational mechanism 310 to change the plane of the tracker 300 to the second angle.

During morning backtracking, the row controller 410 sets the angle of the tracker 300 so that the shadow from an eastern, adjacent tracker 300 (tracker B 510) will come as close as possible to the lower edge of the tracker 300 (tracker C 515) in question as possible. This is because in the morning, the sun 315 is rising, so the gap between the shadow and the tracker 300 increases over time. Every time the row controller 410 adjusts the angle of the tracker 300, the shadow moves back to as close as possible to the bottom edge of the tracker 300 (tracker C 515).

During afternoon backtracking, the row controller 410 sets the angle of the tracker 300 so that the shadow from a western, adjacent tracker 300 (tracker D 520) has a gap between the shadow cast by the adjacent tracker 300 (tracker D 520) and the bottom of the tracker 300 in question (tracker C 515). Since the sun 315 is setting, the gap will decrease over time. The goal is to have the gap disappear by the time the sun 315 has moved enough that the row controller 410 needs to move the tracker 300 again.

Process 1000 can be performed dynamically in real time. Process 1000 can also be performed in advance. For example, row controller 410 can determine all of the angles for a day based on knowing where the sun 315 will be positioned at each moment in the day. The steps of process 1000 can also be performed by site controller 415 or other computer devices and the results can be provided to the row controller 410 to know when to adjust the tracker 300 and what angle to adjust the tracker 300 to.

Figure 11:
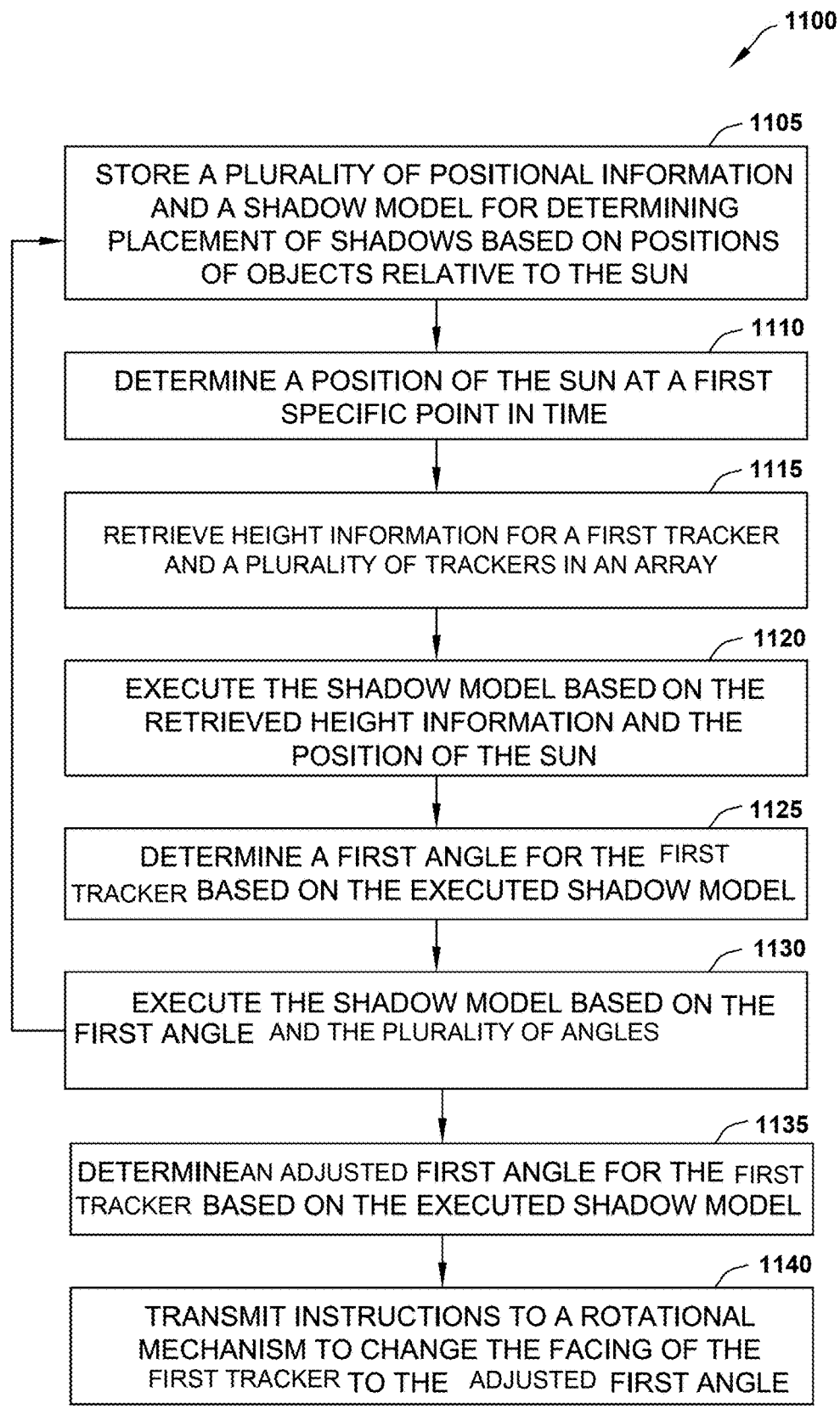
FIG. 11 illustrates a process for performing backtracking on the array of trackers shown in FIGS. 6 and 7.

FIG. 11 illustrates a process 1100 for performing backtracking on the array 600 and 700 of trackers (shown in FIGS. 6 and 7). In at least one embodiment, process 1100 is performed by the row controller 410 (shown in FIG. 4) controlling a single tracker 300 (shown in FIG. 3), such as row controller 740 controlling tracker row 5 715 (both shown in FIG. 7). In another embodiment, process 1100 is performed by the array controller 755 (shown in FIG. 7).

The row controller 410 stores 1105 a plurality of positional information and a shadow model for determining placement of shadows based on positions of objects relative to the sun in the at least one memory device. In some embodiments, the row controller 410 also stores height information for each of the trackers 300 in the array 700.

The row controller 410 determines 1110 a position of the sun 315 (shown in FIG. 3) at a first specific point in time. The row controller 410 retrieves 1115 height information for the plurality of trackers 300 in the array 700 from the at least one memory device. The first height of the first tracker 300 is different than a second height of a second tracker 300 of the plurality of trackers 300 in the array 700. For example, tracker 705 is a first height and tracker 725 is at the second height. Both heights are based on the top of support column 305 (shown in FIG. 3) of the corresponding tracker 300. In some embodiments, the support column 305 is the same height for each tracker 300, but the relative heights of the tops of the support columns 305 is based on the terrain in which the support columns 305 are placed. In other words, a difference in the first height of the tracker 300 and a second height of the at least one adjacent tracker 300 is based on terrain where the individual tracker 300 is positioned.

The row controller 410 executes 1120 the shadow model based on the retrieved height information and the position of the sun 315. The row controller 410 determines 1125 a first angle for the first tracker 300 based on the executed shadow model. The row controller 410 collects 1130 an angle for each tracker 300 in the plurality of trackers 300 in the array 700. While the row controller 410 is collecting 1130 the angle for each tracker, the row controller 410 is also transmitting the first angle to the other row controllers 410. The angles from each tracker 300 are the angle that was calculated by each individual row controller 410. Each row controller 410 transmits its calculated angle to the other row controllers 410. The row controller 410 adjusts 1135 the first angle based on executing the shadow model with the first angle and the plurality of angles associated with the plurality of trackers 300 in the array 700. For example, the row controller 410 determines a first position of a first shadow cast by the second tracker 300. The row controller 410 determines the adjusted first angle for the first tracker 300 to avoid the first shadow. The row controller 410 determines a second position of a second shadow cast by the first tracker 300. The row controller 410 determines the adjusted first angle for the first tracker 300 to avoid casting the second shadow on a third tracker 300 of the plurality of trackers 300.

The row controller 410 transmits 1140 instructions to the rotational mechanism 310 to change the plane of the tracker 300 to the adjusted first angle.

In some embodiments, the row controller 410 collects a plurality of adjusted angles for each tracker 300 in the plurality of trackers 300. Where the adjusted angles are calculated by the row controllers 410 of each row of trackers 300 in the array 700 based on the plurality of angles and the first angle. The row controller 410 further adjusts the adjusted first angle based on executing the shadow model with the adjusted first angle and the plurality of adjusted angles. These steps, of collecting adjusted angles from the other row controllers 410 and readjusting the first angle can be cycled through repeatedly until desired conditions are met. One set of desired conditions is maximum amount of irradiance collect for the array 700 as a whole or the amount of irradiance to be collected that exceeds a predetermined threshold. Another set of desired conditions can be no shadows being cast on any of the trackers 300.

The row controller 410 determines a first amount of irradiance to be collected based on the first angle, the plurality of angles, and the shadow model. The row controller 410 determines a second amount of irradiance to be collected based on the adjusted first angle, the plurality of adjusted angles, and the shadow model. The row controller 410 compares the first amount of irradiance to be collected with the second amount of irradiance to be collected. Then the row controller 410 determines whether to transmit instructions for the first angle or the adjusted first angle based on the comparison. The row controller 410 can make repeated amount of irradiance to be collected comparisons to determine which set of angles provides the maximum irradiance collected. By repeatedly cycling through the steps of process 1100, the row controller 410 determines an adjusted first angle to maximize an amount of irradiance to be collected by the plurality of trackers 300 in the array 700.

The row controller 410 determines a second position of the sun 315 at a second specific point in time. The row controller 410 executes the shadow model based on the retrieved height information and the second position of the sun 315. The row controller 410 determines a second angle for the first tracker 300 based on the executed shadow model. The row controller 410 collects an additional angle for each tracker 300 in the plurality of trackers 300. The row controller 410 adjusts the second angle based on executing the shadow model with the second angle and the plurality of additional angles associated with the plurality of trackers 300. The row controller 410 transmits instructions to the rotational mechanism 310 to change the plane of the first tracker 300 to the adjusted second angle. The row controller 410 can determine if a difference between the position of the sun 315 and the second position of the sun 315 exceeds a predetermined threshold. If the difference exceeds the predetermined threshold, the row controller 410 can transmit instructions to the rotational mechanism 310 to change the plane of the first tracker 300 to the adjusted second angle.

In some embodiments, the first tracker 300 is in a first row including a plurality of trackers 300 in a row. In these embodiments, the row controller 410 instructs every tracker 300 in the first row to change the plane of the plurality of trackers 300 in the first row to the adjusted first angle.

In some embodiments, the array controller 755 performs the steps of Process 1100 for all of the trackers 300 in the array 700. In these embodiments, the array controller 755 determines a first angle for the first tracker and the plurality of angles for the plurality of trackers 300 in the array 700 based on the executed shadow model.

Process 1100 can be performed dynamically in real time. Process 1100 can also be performed in advance. For example, row controller 410 can determine all of the angles for a day based on knowing where the sun 315 will be positioned at each moment in the day. The steps of process 1000 can also be performed by site controller 415 or other computer devices and the results can be provided to the row controller 410 to know when to adjust the tracker 300 and what angle to adjust the tracker 300 to.

Figure 12:
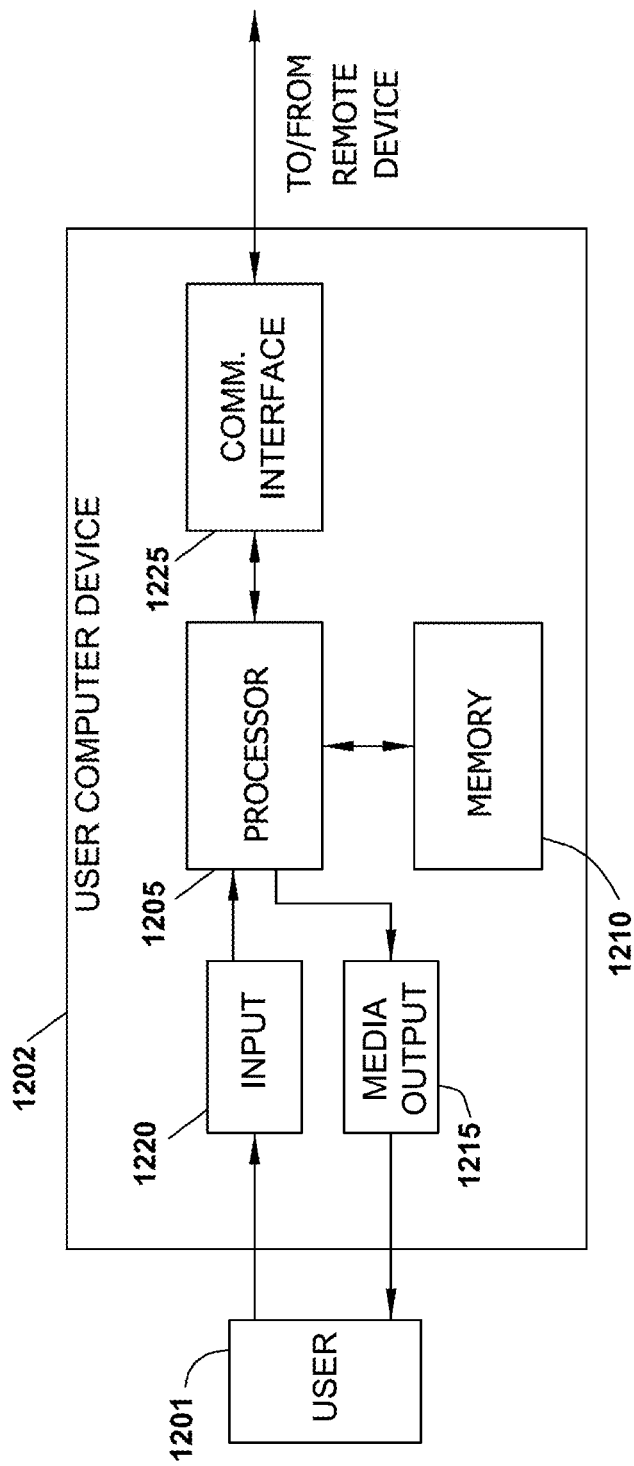
FIG. 12 illustrates an example configuration of a user computer device used in the solar site shown in FIG. 4, in accordance with one example of the present disclosure.

FIG. 12 illustrates an example configuration of a user computer device 1202 used in the site 405 (shown in FIG. 4), in accordance with one example of the present disclosure. User computer device 1202 is operated by a user 1201. The user computer device 1202 can include, but is not limited to, the row controller 410, the site controller 415, and the sensors 420 (all shown in FIG. 1). The user computer device 1202 includes a processor 1205 for executing instructions. In some examples, executable instructions are stored in a memory area 1210. The processor 1205 can include one or more processing units (e.g., in a multi-core configuration). The memory area 1210 is any device allowing information such as executable instructions and/or transaction data to be stored and retrieved. The memory area 1210 can include one or more computer-readable media.

The user computer device 1202 also includes at least one media output component 1215 for presenting information to the user 1201. The media output component 1215 is any component capable of conveying information to the user 1201. In some examples, the media output component 1215 includes an output adapter (not shown) such as a video adapter and/or an audio adapter. An output adapter is operatively coupled to the processor 1205 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some examples, the media output component 1215 is configured to present a graphical user interface (e.g., a web browser and/or a client application) to the user 1201. A graphical user interface can include, for example, an interface for viewing the performance information about a tracker 300 (shown in FIG. 3). In some examples, the user computer device 1202 includes an input device 1220 for receiving input from the user 1201. The user 1201 can use the input device 1220 to, without limitation, select to view the performance of a tracker 300. The input device 1220 can include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen can function as both an output device of the media output component 1215 and the input device 1220.

The user computer device 1202 can also include a communication interface 1225, communicatively coupled to a remote device such as the site controller 415. The communication interface 1225 can include, for example, a wired or wireless network adapter and/or a wireless data transceiver for use with a mobile telecommunications network.

Stored in the memory area 1210 are, for example, computer-readable instructions for providing a user interface to the user 1201 via the media output component 1215 and, optionally, receiving and processing input from the input device 1220. A user interface can include, among other possibilities, a web browser and/or a client application. Web browsers enable users, such as the user 1201, to display and interact with media and other information typically embedded on a web page or a website from the row controller 410. A client application allows the user 1201 to interact with, for example, the row controller 410. For example, instructions can be stored by a cloud service, and the output of the execution of the instructions sent to the media output component 1215.

The processor 1205 executes computer-executable instructions for implementing aspects of the disclosure. In some examples, the processor 1205 is transformed into a special purpose microprocessor by executing computer-executable instructions or by otherwise being programmed. For example, the processor 1205 is programmed with instructions such as those shown in FIGS. 10 and 11.

Described herein are computer systems such as the row controller and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers; reduced instruction set circuits (RISC), application-specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer-readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The methods and system described herein may be implemented using computer programming or engineering techniques including computer software, firmware, hardware, or any combination or subset. As disclosed above, at least one technical problem with prior systems is that there is a need for systems for a cost-effective and reliable manner for determining a direction of arrival of a wireless signal. The system and methods described herein address that technical problem. Additionally, at least one of the technical solutions to the technical problems provided by this system may include: (i) improved accuracy in determining proper angles for solar trackers, (ii) reduced shadows on solar trackers during dusk and dawn hours; (iii) increased overall solar irradiance collected; (iv) up-to-date positioning of solar trackers based on adjacent solar trackers; and (v) reduced processing power needed to calculate necessary angles for optimal solar collection.

The methods and systems described herein may be implemented using computer programming or engineering techniques including computer software, firmware, hardware, or any combination or subset thereof, wherein the technical effects may be achieved by performing at least one of the following steps: a) store, in the at least one memory device, a plurality of positional information and a shadow model for determining placement of shadows based on positions of objects relative to the sun; b) determine a position of the sun at a first specific point in time; c) retrieve, from the at least one memory device, height information for the plurality of trackers in the array, wherein a first height of the first tracker is different than a second height of a second tracker of the plurality of trackers in the array, wherein a difference in the first height of the first tracker and the second height of the second tracker is based on terrain where the array is positioned, wherein the first tracker is in a first row comprising a plurality of trackers in a row, and wherein the at least one processor is programmed to instruct every tracker in the first row to change the plane of the plurality of trackers in the first row to the adjusted first angle; d) execute the shadow model based on the retrieved height information and the position of the sun; e) determine a first angle for the first tracker based on the executed shadow model; f) collect an angle for each tracker in the plurality of trackers in the array; g) adjust the first angle based on executing the shadow model with the first angle and the plurality of angles associated with the plurality of trackers in the array; h) transmit instructions to the rotational mechanism to change the plane of the tracker to the adjusted first angle; i) collect a plurality of adjusted angles for each tracker in the plurality of trackers; j) adjust the adjusted first angle based on executing the shadow model with the adjusted first angle and the plurality of adjusted angles; k) determine a first amount of irradiance to be collected based on the first angle, the plurality of angles, and the shadow model; l) determine a second amount of irradiance to be collected based on the adjusted first angle, the plurality of adjusted angles, and the shadow model; m) compare the first amount of irradiance to be collected with the second amount of irradiance to be collected; n) determine whether to transmit instructions for the first angle or the adjusted first angle based on the comparison; o) determine an adjusted first angle to maximize an amount of irradiance to be collected by the plurality of trackers in the array; p) transmit the first angle to a plurality of controllers associated with the plurality of trackers in the array; q) determine a first angle for the first tracker and the plurality of angles for the plurality of trackers in the array based on the executed shadow model; r) determine a second position of the sun at a second specific point in time; s) execute the shadow model based on the retrieved height information and the second position of the sun; t) determine a second angle for the first tracker based on the executed shadow model; u) collect an additional angle for each tracker in the plurality of trackers; v) adjust the second angle based on executing the shadow model with the second angle and the plurality of additional angles associated with the plurality of trackers; w) transmit instructions to the rotational mechanism to change the plane of the first tracker to the adjusted second angle; x) determine if a difference between the position of the sun and the second position of the sun exceeds a predetermined threshold; y) if the difference exceeds the predetermined threshold, transmit instructions to the rotational mechanism to change the plane of the first tracker to the adjusted second angle; z) determine a first position of a first shadow cast by the second tracker; aa) determine the adjusted first angle for the first tracker to avoid the first shadow; bb) determine a second position of a second shadow cast by the first tracker; and cc) determine the adjusted first angle for the first tracker to avoid casting the second shadow on a third tracker of the plurality of trackers.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   a first tracker attached to a rotational mechanism for changing a plane of the first tracker, wherein the first tracker is configured to collect solar irradiance, and wherein the first tracker is in an array including a plurality of trackers; and
   a controller in communication with the rotational mechanism, the controller comprising at least one processor in communication with at least one memory device, and wherein each tracker of the plurality of trackers is associated with a controller, wherein the at least one processor is programmed to:
   store, in the at least one memory device, a plurality of positional information and a shadow model for determining placement of shadows based on positions of objects relative to the sun;
   determine a position of the sun at a first specific point in time;
   retrieve, from the at least one memory device, height information for the plurality of trackers in the array, wherein a first height of the first tracker is different than a second height of a second tracker of the plurality of trackers in the array, wherein the height information includes heights from one or more trackers of the plurality of trackers adjacent to the first tracker and one or more trackers of the plurality of trackers that are non-adjacent to the first tracker;
   execute the shadow model based on the retrieved height information and the position of the sun;
   determine a first angle for the first tracker based on the executed shadow model;
   collect an angle for each tracker in the plurality of trackers in the array;
   adjust the first angle based on executing the shadow model with the first angle and the plurality of angles associated with the plurality of trackers in the array;
   collect a plurality of adjusted angles for each tracker in the plurality of trackers;
   determine a first amount of irradiance to be collected based on the first angle, the plurality of angles, and the shadow model;
   determine a second amount of irradiance to be collected based on the adjusted first angle, the plurality of adjusted angles, and the shadow model;
   compare the first amount of irradiance to be collected with the second amount of irradiance to be collected;
   determine whether to transmit instructions for the first angle or the adjusted first angle based on the comparison; and
   transmit the determined instructions to the rotational mechanism to change the plane of the tracker.

2. The system in accordance with claim 1, wherein the at least one processor is further programmed to:
   further adjust the adjusted first angle based on executing the shadow model with the adjusted first angle and the plurality of adjusted angles.

3. The system in accordance with claim 1, wherein the at least one processor is further programmed to determine an adjusted first angle to maximize an amount of irradiance to be collected by the plurality of trackers in the array.

4. The system in accordance with claim 1, wherein the at least one processor is further programmed to transmit the first angle to a plurality of controllers associated with the plurality of trackers in the array.

5. The system in accordance with claim 1, wherein the at least one processor is further programmed to determine a first angle for the first tracker and the plurality of angles for the plurality of trackers in the array based on the executed shadow model.

6. The system in accordance with claim 1, where the at least one processor is further programmed to:
   determine a second position of the sun at a second specific point in time;
   execute the shadow model based on the retrieved height information and the second position of the sun;
   determine a second angle for the first tracker based on the executed shadow model;
   collect an additional angle for each tracker in the plurality of trackers;
   adjust the second angle based on executing the shadow model with the second angle and the plurality of additional angles associated with the plurality of trackers; and
   transmit instructions to the rotational mechanism to change the plane of the first tracker to the adjusted second angle.

7. The system in accordance with claim 6, wherein the at least one processor is further programmed to:
   determine if a difference between the position of the sun and the second position of the sun exceeds a predetermined threshold; and
   if the difference exceeds the predetermined threshold, transmit instructions to the rotational mechanism to change the plane of the first tracker to the adjusted second angle.

8. The system in accordance with claim 1, wherein a difference in the first height of the first tracker and the second height of the second tracker is based on terrain where the array is positioned.

9. The system in accordance with claim 1, wherein the first tracker is in a first row comprising a plurality of trackers in a row, and wherein the at least one processor is programmed to instruct every tracker in the first row to change the plane of the plurality of trackers in the first row to the adjusted first angle.

10. The system in accordance with claim 1, wherein the at least one processor is further programmed to:
    determine a first position of a first shadow cast by the second tracker; and
    determine the adjusted first angle for the first tracker to avoid the first shadow.

11. The system in accordance with claim 10, wherein the at least one processor is further programmed to:
    determine a second position of a second shadow cast by the first tracker; and
    determine the adjusted first angle for the first tracker to avoid casting the second shadow on a third tracker of the plurality of trackers.

12. A method for operating a first tracker in an array, the method implemented by at least one processor in communication with at least one memory device, the method comprises:
- storing, in the at least one memory device, a plurality of positional information and a shadow model for determining placement of shadows based on positions of objects relative to the sun;
- determining a position of the sun at a first specific point in time;
- retrieving, from the at least one memory device, height information for the first tracker and a plurality of trackers in the array, wherein a first height of the first tracker is different than a second height of a second tracker of the plurality of trackers in the array, wherein the height information includes heights from one or more trackers of the plurality of trackers adjacent to the first tracker and one or more trackers of the plurality of trackers that are non-adjacent to the first tracker;
- executing the shadow model based on the retrieved height information and the position of the sun;
- determining a first angle for the first tracker based on the executed shadow model;
- collecting an angle for each tracker in the plurality of trackers in the array;
- adjusting the first angle based on executing the shadow model with the first angle and the plurality of angles associated with the plurality of trackers in the array;
- collecting a plurality of adjusted angles for each tracker in the plurality of trackers:
- determining a first amount of irradiance to be collected based on the first angle, the plurality of angles, and the shadow model;
- determining a second amount of irradiance to be collected based on the adjusted first angle, the plurality of adjusted angles, and the shadow model;
- comparing the first amount of irradiance to be collected with the second amount of irradiance to be collected; and
- determining whether to transmit instructions for the first angle or the adjusted first angle based on the comparison; and
- transmitting the determined instructions to change a plane of the first tracker.

13. The method in accordance with claim 12 further comprising:
- adjusting the adjusted first angle based on executing the shadow model with the adjusted first angle and the plurality of adjusted angles.

14. A controller for a first tracker in an array, the controller including at least one physical processor in communication with at least one memory device, the at least one processor programmed to:
- store, in the at least one memory device, a plurality of positional information and a shadow model for determining placement of shadows based on positions of objects relative to the sun;
- determine a position of the sun at a first specific point in time;
- retrieve, from the at least one memory device, height information for the first tracker and a plurality of trackers in the array, wherein a first height of the first tracker is different than a second height of a second tracker of the plurality of trackers in the array, wherein the height information includes heights from one or more trackers of the plurality of trackers adjacent to the first tracker and one or more trackers of the plurality of trackers that are non-adjacent to the first tracker;
- execute the shadow model based on the retrieved height information and the position of the sun;
- determine a first angle for the first tracker based on the executed shadow model;
- collect an angle for each tracker in the plurality of trackers in the array;
- adjust the first angle based on executing the shadow model with the first angle and the plurality of angles associated with the plurality of trackers in the array;
- collect a plurality of adjusted angles for each tracker in the plurality of trackers;
- determine a first amount of irradiance to be collected based on the first angle, the plurality of angles, and the shadow model;
- determine a second amount of irradiance to be collected based on the adjusted first angle, the plurality of adjusted angles, and the shadow model;
- compare the first amount of irradiance to be collected with the second amount of irradiance to be collected;
- determine whether to transmit instructions for the first angle or the adjusted first angle based on the comparison; and
- transmit the determined instructions to a rotational mechanism connected to the first tracker to change a plane of the first tracker.

15. The controller in accordance with claim 14, wherein the at least one processor is further programmed to:
- adjust the adjusted first angle based on executing the shadow model with the adjusted first angle and the plurality of adjusted angles.

16. The controller in accordance with claim 14, wherein the at least one processor is further programmed to determine an adjusted first angle to maximize an amount of irradiance to be collected by the plurality of trackers in the array.

17. The controller in accordance with claim 14, wherein the at least one processor is further programmed to:
- determine a second position of the sun at a second specific point in time;
- execute the shadow model based on the retrieved height information and the second position of the sun;
- determine a second angle for the first tracker based on the executed shadow model;
- collect an additional angle for each tracker in the plurality of trackers;
- adjust the second angle based on executing the shadow model with the second angle and the plurality of additional angles associated with the plurality of trackers; and
- transmit instructions to the rotational mechanism to change the plane of the first tracker to the adjusted second angle.

* * * * *